United States Patent
Bareis

(10) Patent No.: US 8,899,119 B2
(45) Date of Patent: Dec. 2, 2014

(54) DEVICE FOR PRESSING ON A RACK

(71) Applicant: ZF Lenksysteme GmbH, Schwaebisch Gmuend (DE)

(72) Inventor: Helmut Bareis, Eschach (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 16 days.

(21) Appl. No.: 13/660,452

(22) Filed: Oct. 25, 2012

(65) Prior Publication Data
US 2013/0047763 A1   Feb. 28, 2013

Related U.S. Application Data

(63) Continuation of application No. PCT/DE2011/075057, filed on Mar. 30, 2011.

(30) Foreign Application Priority Data

Apr. 28, 2010 (DE) .......................... 10 2010 028 308

(51) Int. Cl.
*B62D 3/12* (2006.01)
*F16H 55/28* (2006.01)

(52) U.S. Cl.
CPC .............. *B62D 3/123* (2013.01); *F16H 55/283* (2013.01)
USPC ................................ 74/89.17; 74/422; 74/409

(58) Field of Classification Search
CPC ....................................................... B62D 3/123
USPC ............................ 74/388 PS, 409, 422, 89.17
See application file for complete search history.

(56) References Cited

U.S. PATENT DOCUMENTS

| 4,724,717 | A | 2/1988 | Chikuma |
| 7,487,984 | B1 | 2/2009 | Lemont, Jr. et al. |
| 7,930,951 | B2 * | 4/2011 | Eickholt ................... 74/388 PS |
| 8,443,689 | B2 * | 5/2013 | Kawakubo et al. ............. 74/422 |
| 2003/0074996 | A1 | 4/2003 | Camp |
| 2009/0120226 | A1 | 5/2009 | Nishikubo |
| 2009/0223314 | A1 | 9/2009 | Eickholt |
| 2011/0297472 | A1 | 12/2011 | Bareis |

FOREIGN PATENT DOCUMENTS

| DE | 201 14 759 | 1/2002 |
| DE | 601 00 767 | 7/2004 |
| DE | 10 2004 053 462 | 5/2006 |
| DE | 10 2006 043 578 | 3/2008 |
| DE | 10 2008 049 489 | 5/2009 |
| DE | 10 2008 054 782 | 7/2010 |
| EP | 1 136 342 | 9/2001 |
| EP | 2 098 435 | 9/2009 |
| WO | WO- 2010/069942 | 6/2010 |

* cited by examiner

*Primary Examiner* — William C Joyce
(74) *Attorney, Agent, or Firm* — Jordan and Hamburg LLP

(57) ABSTRACT

A device for pressing a rack onto a pinion engaged with the rack, in particular for a steering system of a motor vehicle, comprising a pressure piece, which can be loaded in the direction of the rack and is displaceably guided in a housing, and comprising an adjusting device for compensating play that occurs in the steering system. In known devices, the play of the pressure piece must be set by way of an adjusting screw. This proves to be very complicated and problematic. An adjusting screw is therefore provided, wherein a spring washer is disposed between the adjusting screw and the adjusting device, and the adjusting device has a shoulder and the adjusting screw has a recess, or the adjusting device has the recess and the adjusting screw has the shoulder.

10 Claims, 3 Drawing Sheets

DEVICE FOR PRESSING ON A RACK

This is a Continuation of PCT/DE2011/075057 filed Mar. 30, 2011.

BACKGROUND OF THE INVENTION

The invention relates to a device for pressing a rack onto a pinion engaged with the rack, in particular for a steering system of a motor vehicle, comprising a pressure piece, which can be loaded in the direction of the rack and is displaceably guided in a housing, and comprising an adjusting device for compensating play that occurs in the steering system, according to DE 10 2008 054 782.4.

In the devices of the type in question known from the prior art, the play of the pressure piece must be set by way of an adjusting screw. Setting the play often causes problems since the adjusting screw must be safeguarded against unintentional unscrewing. To this end, the adjusting screw is often caulked in the final setting thereof. The caulking and the effect of forces during operation can cause the play of the pressure piece to change in an unwanted manner.

SUMMARY OF THE INVENTION

The object of the invention is to improve the device of the initially stated type in such a way that the complicated and problematic setting of the play can be omitted in the future.

The invention achieves the stated object by way of a device of the type in question, which, according to the invention, comprises an adjusting screw, wherein the spring washer is disposed between the adjusting screw and the adjusting device, and the adjusting device has a shoulder and the adjusting screw has a recess, or the adjusting device has the recess and the adjusting screw has the shoulder. The shoulder of the adjusting device or the adjusting screw results in play that is at least great enough, for example, to compensate irregularities on the toothing between a pinion and a rack, the out-of-roundness of the pinion, nonconformities of parallelism with respect to the toothing of the rack and the back thereof, and other tolerance-related deviations. The recess in the adjusting screw or the adjusting device allows the spring washer to have a range of spring it requires in order to compensate the aforementioned play. The required play is therefore provided exclusively by way of the structural design of the shoulder and the recess. The complicated and problematic setting of a screw is therefore eliminated.

In a development of the invention, the adjusting screw or the adjusting device can comprise a further recess for accommodating the spring washer. In this manner, the spring washer can be held in a certain position against the adjusting screw or against the adjusting device.

The outer edge of the spring washer can bear against the inner edge of the further recess, and the shoulder can bear against the spring washer in the region of the edge of a through-hole of the spring washer. In this manner, the spring washer can be held in the intended position thereof and, simultaneously, the required play can be provided.

In a further embodiment, a shoulder provided in the central region of the adjusting screw or the adjusting device can be inserted into the through-hole of the spring washer. In this manner the spring washer is also held in the intended position.

In order to provide the required play, a shoulder can bear against the spring washer in the region of the outer edge thereof.

In a preferred embodiment, the adjusting device can comprise two adjusting disks, which bear against one another, wherein the adjusting disk bearing against the pressure piece is integral with the pressure piece. Assembly can be greatly simplified by way of the integral design of the pressure piece and the adjusting disk.

The invention further relates to a device for pressing a rack onto a pinion engaged with the rack, in particular for a steering system of a motor vehicle, the device comprising a pressure piece, which can be loaded in the direction of the rack and is displaceably guided in a housing, and comprising an adjusting device for compensating play that occurs in the steering system, according to DE 10 2008 054 782.4, wherein, according to the invention, a spring washer is disposed between the adjusting device and the pressure piece, wherein the adjusting device has a recess in the outer region thereof and the pressure piece has a shoulder opposite thereto, or the pressure piece has the recess and the adjusting device has the shoulder in the region of the spring washer. The shoulder on the pressure piece or on the adjusting device provides the play to be compensated. It should be at least as great as the potential play. The recess in the pressure piece or in the adjusting device allows the spring washer to have the range of spring it requires in order to compensate the play.

To ensure that the spring washer is held in the intended position, the adjusting device can comprise a shoulder that can be circumferentially inserted into a through-hole of the spring washer.

To simplify assembly, the adjusting disk bearing against the adjusting screw can be integral with the adjusting screw.

The shoulder, which can be circumferentially inserted into the through-hole of the spring washer, can be caulkable. The spring washer is thereby provided with an additional safeguard.

The invention also relates to a motor vehicle which comprises a device according to the invention. This can preferably be equipped with an electric steering system. The devices can also be provided for an electric steering system.

Various exemplary embodiments of the devices according to the invention are described in the following with reference to the attached drawings.

DESCRIPTION OF THE PREFERRED EMBODIMENTS

Figure 1:
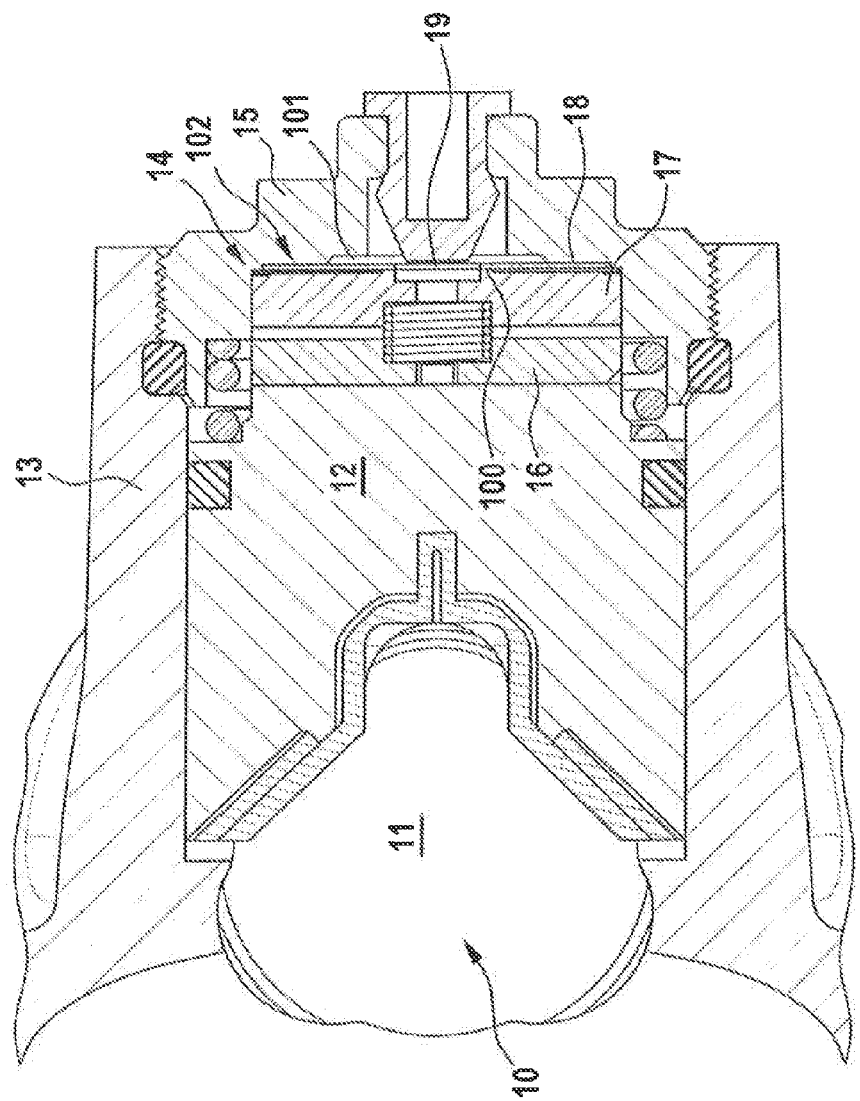
FIG. 1 shows a sectional view through a first embodiment of the device.

FIG. 1 shows a device 10 for pressing a rack 11 onto a pinion engaged with the rack 11; the pinion is not depicted here in greater detail. A pressure piece 12 is displaceably guided in a housing 13.

An adjusting device 14 comprising two adjusting disks 16 and 17, which bear against one another, bears against the pressure piece 12. An adjusting screw 15, which is screwed into the housing 13, is disposed to the right of the adjusting device 14.

A spring washer 18 is disposed between the adjusting screw 15 and the adjusting device 14. The spring washer 18 comprises a through-hole 19, against the edge of which a circumferential shoulder 100 of the adjusting disk 17 bears. The height of the shoulder 100 corresponds at least to play that corresponds to irregularities on the toothing between the pinion and the rack 11, the out-of-roundness of the pinion, nonconformities of parallelism with respect to the toothing of the rack 11 and the back thereof, and other tolerance-related deviations, for example. The through-hole 19 is not, however, absolutely necessary.

The opposite side of the spring washer 19 bears against the adjusting screw 15. A recess 101 is provided between the spring washer 18 and the adjusting screw 15. The spring washer 18 lies in a further recess 102. The outer edge of the spring washer 18 bears against an inner edge of the further recess 102. When the pressure piece 12 is pressed to the right to compensate the play, the spring washer 18 is also pressed to the right, into the recess 101. The recess 101 serves to provide space for the deflection of the spring washer 18.

Figure 2:
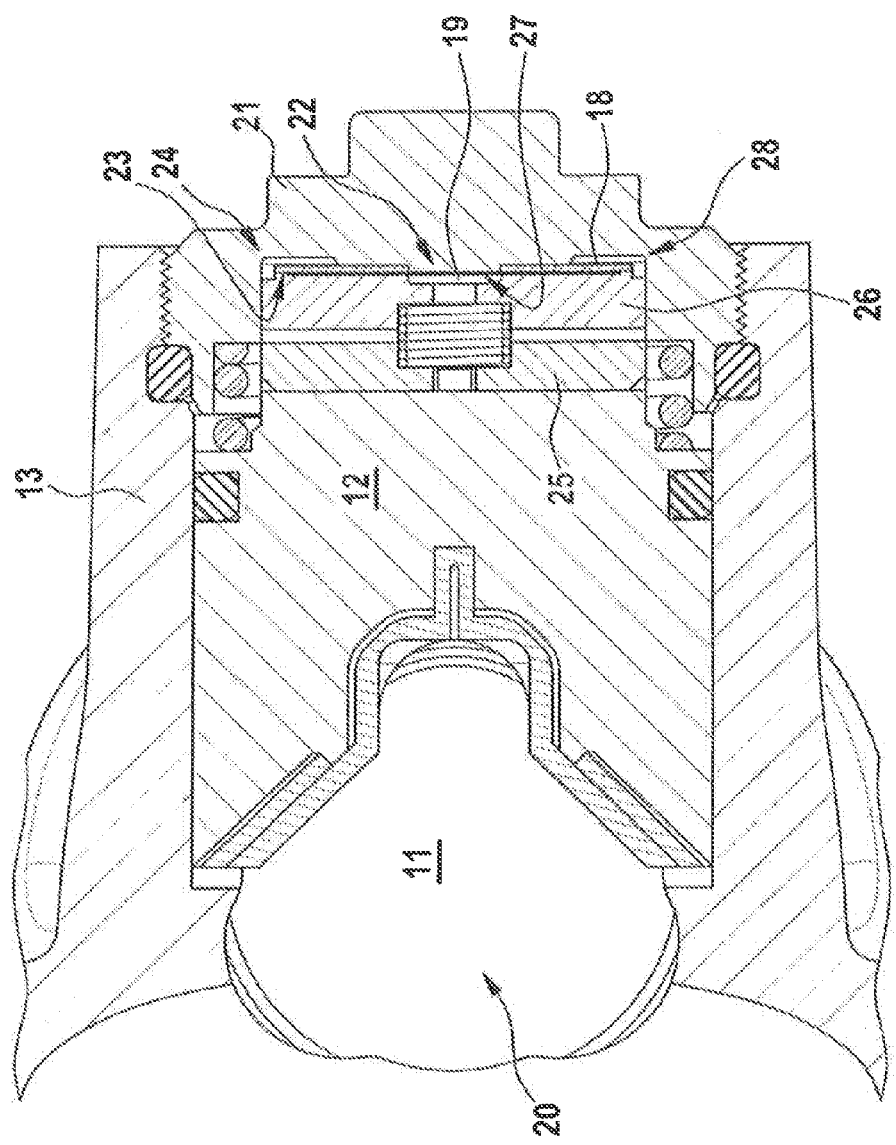
FIG. 2 shows a sectional view through a second embodiment of the device.

FIG. 2 shows a device 20 comprising an adjusting screw 21 and an adjusting device 24 having adjusting disks 25 and 26. A shoulder 22 is provided in the central region of the adjusting screw 21. The shoulder 22 can be inserted into the through-hole 19 of the spring washer 18. The outer region of the spring washer 18 rests on a circumferential shoulder 23 of the adjusting disk 26. The shoulder 23 provides the play to be compensated. A recess 28, which is also circumferential, is provided in the adjusting screw 21, opposite the shoulder 23. The spring washer 18 and the shoulder 23 are pressed into the recess 28 when the pressure piece 12 is moved to the right. A recess 27 provides space for the shoulder 22.

Figure 3:
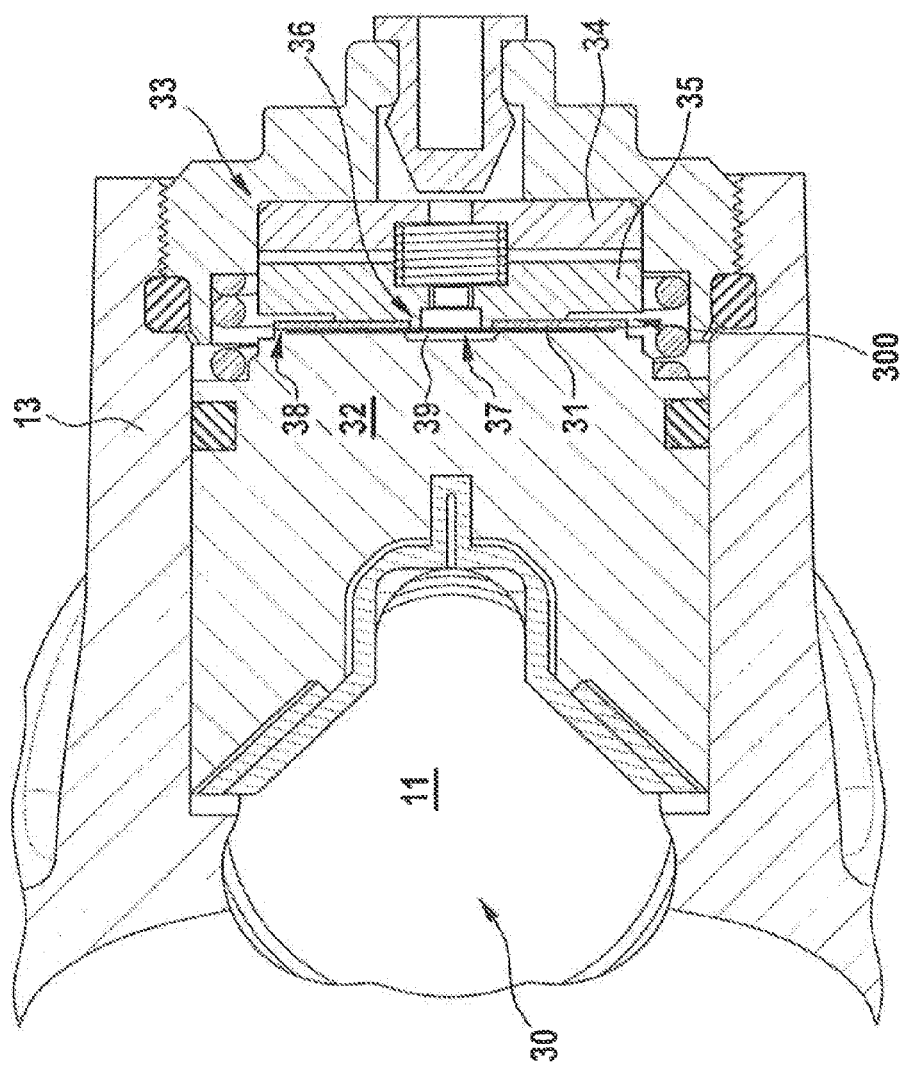
FIG. 3 shows a sectional view through a third embodiment of the device.

FIG. 3 shows a device 30, in which a spring washer 31 is disposed between a pressure piece 32 and an adjusting device 33. The adjusting device 33 comprises two adjusting disks 34 and 35, wherein the adjusting disk 35 has a circumferential shoulder 36 in the central region thereof. The shoulder 36 is inserted into a through-hole 37 of the spring washer 31, thereby holding the spring washer 31 in an intended position.

The pressure piece 32 comprises a circumferential shoulder 38 at the outer edge of the spring washer 31, the shoulder providing the play to be compensated. A circumferential recess 300 is provided opposite the shoulder 38. Thus, when the pressure piece 32 is moved to the right, the outer region of the spring washer 31 bows to the right, into the recess 300. A recess 39 in the pressure piece 32 provides space for the shoulder 36.

The circumferential shoulder 36 can be caulked to provide the spring washer 31 with an additional safeguard.

| 10 | device |
|---|---|
| 11 | rack |
| 12 | pressure piece |
| 13 | housing |
| 14 | adjusting device |
| 15 | adjusting screw |
| 16 | adjusting disk |
| 17 | adjusting disk |
| 18 | spring washer |
| 19 | through-hole |
| 20 | device |
| 21 | adjusting screw |
| 22 | shoulder |
| 23 | shoulder |
| 24 | adjusting device |
| 25 | adjusting disk |
| 26 | adjusting disk |
| 27 | recess |
| 28 | recess |
| 30 | device |
| 31 | spring washer |
| 32 | pressure piece |
| 33 | adjusting device |
| 34 | adjusting disk |
| 35 | adjusting disk |
| 36 | shoulder |
| 37 | through-hole |
| 38 | shoulder |
| 39 | recess |
| 100 | shoulder |
| 101 | recess |
| 102 | recess |
| 300 | recess |

The invention claimed is:

1. A device for pressing a rack onto a pinion engaged with the rack comprising a pressure piece which can be loaded in a direction of the rack and is displaceably guided in a housing, and comprising an automatic adjusting device for compensating play that occurs in the steering system,
   wherein the adjusting device comprises two disks, which bear against one another at contact surfaces, wherein the contact surfaces have at least two slanting surface segments, and wherein the two disks are rotatable relative to one another by way of a torsion spring
   further comprising an adjusting screw, wherein a spring washer is disposed between the adjusting screw and the adjusting device, and the adjusting device has a shoulder and the adjusting screw has a recess, or the adjusting device has the recess and the adjusting screw has the shoulder,
   wherein the shoulder can move resiliently into the spring washer, and
   wherein the size of the shoulder defines the play of the pressure piece.

2. The device according to claim 1, wherein the shoulder is provided in a central region of the adjusting screw or the adjusting device and can be inserted into the through-hole of the spring washer.

3. The device according to claim 2, wherein the shoulder bears against the spring washer in the region of the outer edge thereof.

4. The device according to claim 1, wherein the adjusting device comprises two adjusting disks, which bear against one another, wherein the adjusting disk bearing against the pressure piece is integral with the pressure piece.

5. A motor vehicle comprising a device according to claim 1.

6. The device according to claim 1, wherein the shoulder bears against the spring washer in the region of the outer edge thereof.

7. A device for pressing a rack onto a pinion engaged with the rack comprising a pressure piece which can be loaded in the direction of the rack and is displaceably guided in a housing, and comprising an automatic adjusting device for compensating play that occurs in the steering system;
   wherein the adjusting device comprises two disks, which bear against one another at contact surfaces, wherein the contact surfaces have at least two slanting surface segments, and wherein the two disks are rotatable relative to one another by way of a torsion spring;
   further comprising an adjusting screw, wherein a spring washer is disposed between the adjusting screw and the adjusting device, and the adjusting device has a shoulder and the adjusting screw has a recess, or the adjusting device has the recess and the adjusting screw has the shoulder;
   wherein the shoulder can move resiliently into the spring washer;
   wherein the size of the shoulder defines the play of the pressure piece; and wherein the adjusting screw or the adjusting device comprises a further recess for accommodating the spring washer.

8. The device according to claim 7, wherein the outer edge of the spring washer bears against an inner edge of the further recess and the shoulder bears against the spring washer in the region of an edge of a through-hole of the spring washer.

9. A device for pressing a rack onto a pinion engaged with the rack comprising a pressure piece which can be loaded along a first direction, so as to be loaded in a direction of the rack and is displaceably guided in a housing, and comprising an automatic adjusting device for compensating play that occurs in the steering system,
   wherein the adjusting device comprises two disks, which bear against one another at contact surfaces, wherein the contact surfaces have at least two slanting surface segments, and wherein the two disks are rotatable relative to one another by way of a torsion spring
   further comprising an adjusting screw, wherein a spring washer is disposed along said first direction between the adjusting screw and the adjusting device, and the adjusting device has a shoulder and the adjusting screw has a recess, or the adjusting device has the recess and the adjusting screw has the shoulder,
   wherein the shoulder can move resiliently into the spring washer, and
   wherein the size of the shoulder defines the play of the pressure piece.

10. A device for pressing a rack onto a pinion engaged with the rack comprising a pressure piece which can be loaded in a direction of the rack and is displaceably guided in a housing, and comprising an automatic adjusting device for compensating play that occurs in the steering system,
    wherein the adjusting device comprises two disks, which bear against one another at contact surfaces, wherein the contact surfaces have at least two slanting surface segments, and wherein the two disks are rotatable relative to one another by way of a torsion spring
    further comprising an adjusting screw, wherein a spring washer is disposed between the adjusting screw and the adjusting device, and the adjusting device has a shoulder and the adjusting screw has a recess, or the adjusting device has the recess and the adjusting screw has the shoulder,
    wherein the shoulder can move resiliently into the spring washer and the spring washer can be deflected into the recess.

* * * * *